United States Patent
Kuenstler et al.

(10) Patent No.: US 6,594,990 B2
(45) Date of Patent: Jul. 22, 2003

(54) METHOD FOR REGENERATING A DIESEL PARTICULATE FILTER

(75) Inventors: Johannes Kuenstler, Aachen (DE); Paul Eduard Moraal, Vaals (NL); Urs Christen, Aachen (DE); Yasser Mohamed Sayed Yacoub, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/010,168

(22) Filed: Dec. 10, 2001

(65) Prior Publication Data

US 2002/0073696 A1 Jun. 20, 2002

(30) Foreign Application Priority Data

Nov. 3, 2000 (EP) .............................. 00123966

(51) Int. Cl.$^7$ ................................ F01N 3/00
(52) U.S. Cl. ............. 60/295; 60/274; 60/285; 60/300; 60/278; 60/311
(58) Field of Search .............. 60/274, 278, 284, 60/285, 286, 300, 311, 295

(56) References Cited

U.S. PATENT DOCUMENTS

| | | | |
|---|---|---|---|
| 4,452,040 A | | 6/1984 | Kobashi |
| 4,509,327 A | | 4/1985 | Enga |
| 4,756,155 A | | 7/1988 | Shinzawa |
| 4,835,964 A | * | 6/1989 | Kume et al. .................. 60/285 |
| 5,187,935 A | * | 2/1993 | Akiyama et al. ............. 60/274 |
| 5,195,318 A | | 3/1993 | Shinzawa et al. |
| 6,128,902 A | * | 10/2000 | Kolmanovsky et al. .... 60/605.2 |
| 6,304,815 B1 | * | 10/2001 | Moraal et al. ............... 701/115 |
| 6,412,276 B1 | * | 7/2002 | Salvat et al. .................. 60/295 |
| 6,484,495 B2 | * | 11/2002 | Minami ....................... 60/288 |

FOREIGN PATENT DOCUMENTS

| | | |
|---|---|---|
| DE | 3125305 A1 | 1/1983 |
| DE | 3408057 A1 | 1/1985 |
| DE | 3909932 A1 | 8/1990 |
| DE | 4234841 A1 | 4/1993 |
| DE | 4321767 A1 | 1/1995 |
| FR | 2774426 | 8/1999 |
| FR | 2774428 | 8/1999 |
| FR | 27774427 | 8/1999 |
| GB | 2229937 A | 10/1990 |
| JP | 59122721 | 7/1984 |

* cited by examiner

*Primary Examiner*—Thomas Denion
*Assistant Examiner*—Diem Tran
(74) *Attorney, Agent, or Firm*—Diana D. Brehob

(57) ABSTRACT

A method for regenerating a diesel particulate filter (10) in the exhaust gas system of a diesel engine (5) is disclosed in which particulate matter is burned by increasing the temperature in the diesel particulate filter (10). Regeneration is carried out in a coordinated manner by:

- switching on electrical loads;
- at least partially closing the EGR valve, while adapting the pilot injection to prevent combustion noise exceeding an acceptable level; discontinuing feedback of boost pressure control via variable turbine geometry, when such feedback is present;
- restricting the fresh air supply to provide a desired intake pressure (depends on the speed and load);
- lessening the intake restriction to increase the intake pressure when the operator demands increased power or when the air/fuel ratio falls below a predetermined minimum value;
- increasing fuel supply as a function of the intake pressure, the pedal position and/or the engine speed when the fuel supply is not automatically controlled in some other way; and
- injecting post fuel during the expansion stroke when operating temperature of catalytic converter has been reached.

12 Claims, 3 Drawing Sheets

METHOD FOR REGENERATING A DIESEL PARTICULATE FILTER

FIELD OF THE INVENTION

The present invention relates to a method for regenerating a diesel particulate filter in the exhaust gas system of a diesel engine and for controlling a diesel engine which is set up for carrying out the method.

BACKGROUND OF THE INVENTION

Diesel particulate filters (DPFs) in the exhaust gas system of diesel engines are used to remove unburned soot particles from the exhaust gas. Filters such as these are regenerated periodically by burning the accumulated particulate matter. The particulate matter ignites only at relatively high temperatures, typically, about 550° C. Temperatures such as these are reached only in high load and high engine speed conditions. To ensure operation of the DPF, measures are taken to increase the exhaust gas temperature to sufficiently high levels, regardless of engine operating condition, to cause DPF regeneration.

DE 34 08 057 describes a method to ignite particulate matter in a DPF of a diesel engine by increasing the engine load using vehicle brakes, compression release brakes, exhaust brakes, or the like. This applies mainly to commercial vehicles.

DE 43 21 767 is of similar content as DE 34 08 057, but directed to industrial vehicles.

DE 39 09 932 describes a method to regenerate a DPF for an engine with a turbocharger where for low to medium engine loads the exhaust gas will bypass the turbocharger to increase the exhaust temperature and at the same time reduce the intake airflow or use an intake airflow heater.

DE 42 34 841 describes a method to regenerate a DPF for diesel engines by adjusting EGR. To increase the exhaust temperature, EGR rate is reduced.

DE 31 25 305 describes a method to regenerate a DPF for an engine with a turbocharger. A controlled portion of the exhaust gas stream bypasses the turbocharger.

Other procedures have been proposed for such an increase in the exhaust gas temperature. For example, engine load can be increased artificially by switching on electrical loads. If the diesel engine is equipped with a catalytic converter upstream of the DPF additional fuel can be injected into the combustion chamber or into the exhaust gas system. The unburned fuel is oxidized in the catalytic converter causing heat release and a temperature rise in the DPF.

The inventors of the present invention have recognized that individual measures such as these result in problems in that they intervene in complex mutual relationships so that, depending on the engine operating conditions; even the opposite of the desired effect can occur in some circumstances. To illustrate the problem, limits and interactions between the various subsystems for exhaust gas temperature control are described, by way of example, in the following text:

i. Exhaust gas temperature may be as low as 100° C. when the engine is idling, operating at low load, or operating at low speed. This temperature is well below the lightoff temperature or activation temperature of the catalytic converter, that is, below the temperature at which significant oxidation rates are achieved for hydrocarbons and carbon monoxide. Thus, in operating conditions such as these, post injection of fuel, with the aim of passing hydrocarbons to the oxidation catalytic converter, would have negligible effect on the inlet temperature at the DPF.

ii. At higher engine speeds and loads, exhaust gas temperature is high enough for the catalytic converter to cause oxidation of hydrocarbons, carbon monoxide and unburned fuel. However, the speed of the gases through the converter may be too high, so that the residence time in the catalytic converter is insufficient for complete conversion of the unburned hydrocarbons.

iii. By restricting intake flow, the ratio between the pressure in the exhaust manifold and in the intake manifold rises. This pressure ratio causes exhaust gas recirculation (EGR) flow when the EGR valve is open. If the intake is restricted to a major extent by closing the intake throttle valve, EGR can become excessive.

iv. Reducing intake throttle opening increases engine pumping losses, which leads to a reduction in the torque available at the shaft.

v. If engine load is high, i.e., the main fuel injection quantity is high, and the intake is restricted, the air/fuel ratio may become too low meaning that there is little oxygen remaining after the combustion event. Post-injected fuel cannot be oxidized in the catalytic converter and oxygen is not available for combustion of the carbon in the DPF.

vi. The turbocharger, if the engine is so equipped, may have a variable geometry turbine (VGT) in the exhaust duct which is coupled by a shaft to the intake compressor in the intake duct. VGT provides a degree of control over intake pressure by adjusting the angle of the turbine's vanes. If the turbocharger has a VGT, the turbine vanes are closed when the throttle valve is closed. This can lead to turbocharger over speed and an unnecessary temperature drop across the turbine.

SUMMARY OF THE INVENTION

A method for raising the temperature in a particulate filter, which overcomes disadvantages of prior approaches, is disclosed. The particulate filter is located in an exhaust duct coupled to a multi-cylinder, reciprocating engine located downstream of a catalytic converter which is also located in the exhaust duct. The method includes the steps of: closing, at least partially, an exhaust gas recirculation valve; adjusting an intake throttle valve disposed in the intake duct toward a closed position to provide a desired intake pressure; and increasing a main quantity of fuel supplied in a main fuel injection in response to the above steps. Preferably, the method further includes: discontinuing feedback control of a variable geometry turbine located in the exhaust duct upstream of the catalytic converter in response to closing the exhaust gas recirculation valve; injecting a quantity of post injected fuel when a temperature in a catalytic converter exceeds a predetermined activation temperature; and adjusting a timing and quantity of a pilot injection such that a noise level generated by combustion in the engine remains below a predetermined acceptable level.

A system for an engine capable of increasing temperature in a particulate filter disposed in an exhaust coupled to the engine is disclosed. The engine has a multiplicity of cylinders with pistons reciprocating within the cylinders, an intake with an intake throttle valve, a fuel injection system providing at least one fuel injector in each cylinder, and an exhaust gas recirculation system. The engine has an exhaust turbine located upstream of the particulate filter in the exhaust. The exhaust gas recirculation system is coupled to the engine intake and the engine exhaust via an exhaust gas recirculation valve. The fuel injection system is capable of providing multiple injections in each cylinder during a single revolution of the engine. The system includes an electronic control unit operably connected to the engine, the exhaust recirculation valve, the throttle valve, and the fuel injectors. The electronic control unit closes, at least partially, the exhaust gas recirculation valve; closes, at least partially, the intake throttle valve; increases a quantity of main fuel supplied in a main fuel injection event.

An advantage of the present invention is that a coordinated method for regeneration of the particulate filter in a diesel engine is provided. The method takes into account of the relationships between the various parameters and ensures a robust regeneration under all engine operating conditions. Furthermore, the coordinated approached of the present invention overcomes the difficulty with prior approaches in that they occasionally cause the opposite of the desired effect.

The above advantage, other advantages, and features of the present invention will be readily apparent from the following detailed description of the preferred embodiments when taken in connection with the accompanying drawings.

BRIEF DESCRIPTION OF THE DRAWINGS

The advantages described herein will be more fully understood by reading an example of an embodiment in which the invention is used to advantage, referred to herein as the Detailed Description, with reference to the drawings wherein.

DETAILED DESCRIPTION OF A PREFERRED EMBODIMENT

Figure 1:
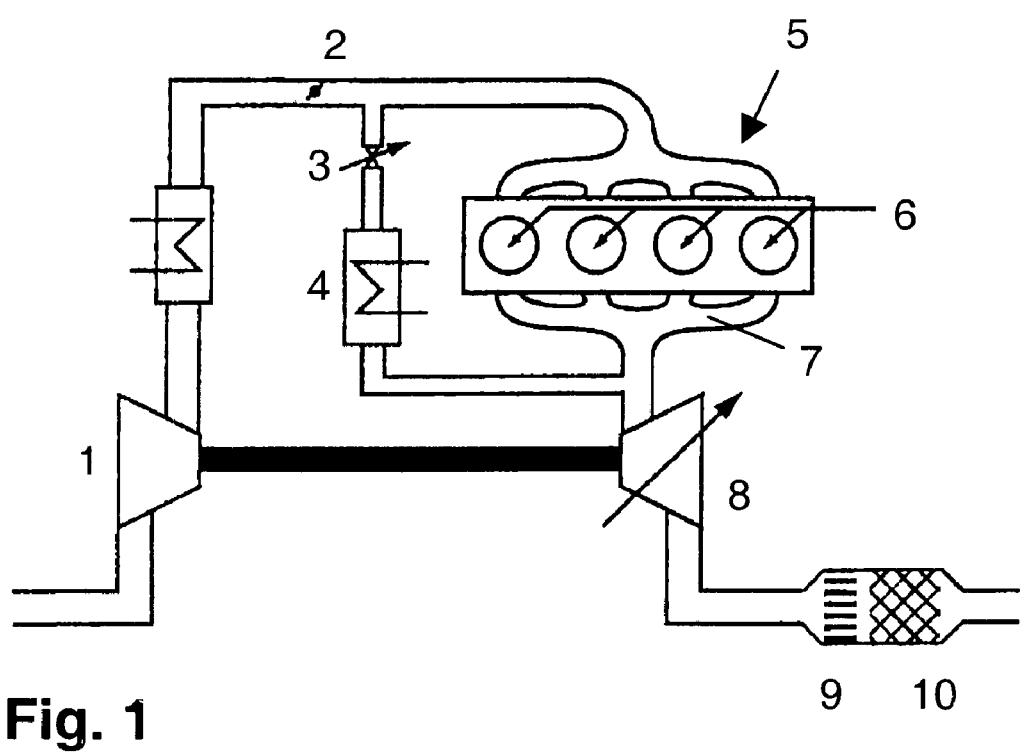
FIG. 1 shows, schematically, those components of a diesel engine involved in carrying out the method.

FIG. 1 shows, schematically, those components of a diesel engine significant to the present invention. Air is inducted and compressed by a compressor 1, and is supplied to diesel engine 5 through its intake manifold. An intake throttle valve 2 is, in the air duct between compressor 1 and diesel engine 5. Fuel is injected into the cylinders of diesel engine 5 via fuel injectors 6, and is burned with the air. The exhaust gases produced in the cylinder leave diesel engine 5 via exhaust manifold 7.

A portion of these exhaust gases is supplied by an EGR system to the intake of diesel engine 5. Exhaust gases pass through an EGR cooler 4 and an EGR valve 3. EGR quantity is controlled by EGR valve 3.

The portion of the exhaust gases which is not recirculated to the intake manifold flows into a turbine 8, possibly a VGT type, which rotates by expansion of exhaust gases flowing through it. Turbine 8 is coupled to and provides the driving force for compressor 1. Exhaust gases then flow into an exhaust gas aftertreatment system comprising an oxidation catalytic converter 9 and a DPF 10 located downstream of turbine 8.

To remove particulate matter from DPF 10, it is known to increase exhaust gas temperature above the ignition temperature of the particulate matter. There are at least three measures for increasing exhaust gas temperature:

reducing the gas flow through the engine so that the energy released during combustion is distributed over less mass;

reducing engine efficiency, so that more energy is consumed for the same mechanical power, and more thermal energy is rejected into the exhaust gases;

and providing unburned hydrocarbons to catalytic converter 9 to react within exothermically.

The exhaust gas flow is reduced by restricting the amount of air inducted into engine 5, which is accomplished by partially closing intake throttle 2. This increases pumping losses, which decreases engine efficiency.

The output power level of the engine is increased further when electrical loads are applied to the alternator.

The hydrocarbons, mentioned above, can be provided either by injecting additional fuel into all of the cylinders, or some of the cylinders, after the fuel injected in the main injection has ignited and substantially fully combusted, termed post injection, or by direct injection of fuel into the exhaust gas duct at a location upstream of catalytic converter 9. If the engine, as illustrated in FIG. 1, is equipped with a variable geometry turbine (VGT) 8, mass air flow rate and efficiency can also be varied by VGT position.

The present invention is based in a known manner on the fact that particulate matter is burned by increasing the temperature of the exhaust gas above the ignition temperature of the filter residues. The coordinated approach of the present invention is described below:

a) Electrical loads that are suitable for this purpose are switched on, to increase the engine load and thereby increase the amount of rejected heat in the exhaust stream. Suitable electrical loads are, for example, glow plugs in the diesel engine, windshield heating and the like. The engine may or may not be equipped with suitable electrical devices. Even if such devices exist, this step is not crucial to the successful implementation of the present invention.

b) The EGR valve is closed, so that restriction can be carried out later (item d). At the same time, the pilot injection parameters are adapted, as appropriate, to maintain combustion noise within acceptable limits.

c) If boost pressure control is provided by means of a turbocharger with a variable geometry turbine (VGT) and the VGT is feedback controlled to a specific intake manifold pressure, this feedback loop is opened. Alternatively, basic control (feed forward) can be used for turbine control, or the position of the VGT can be set to new, calibrated values.

d) The fresh air supply is restricted such that the intake manifold pressure assumes a value that depends on engine speed and load. The air mass flow is thus reduced so that the same amount of thermal energy is distributed over a smaller amount of exhaust gas.

e) The above-mentioned restriction of the fresh air supply (item d) is lessened if increased power is demanded by the driver. This may be indicated by sudden depression of the accelerator pedal. This ensures that the engine still produces an acceptable driving response. Also, the intake restriction is lessened if the air/fuel ratio falls below a predetermined minimum value. This ensures that both the catalytic converter and the DPF receive the required amount of oxygen for the chemical reactions taking place therein.

f) If the fuel supply is not controlled automatically (by means of an idle speed regulator or cruise control), the fuel supply is increased to compensate for losses and changes in combustion efficiency. The fuel supply is preferably increased as a function of intake manifold pressure, accelerator pedal position and engine speed.

g) Finally, fuel may be injected at a time late in the combustion stroke, provided the catalytic converter, which is arranged upstream of the DPF, has reached its operating temperature. Consequently, unburned hydrocarbons are supplied to the catalytic converter and are reacted in the catalytic converter, thereby causing a temperature rise in the exhaust gases and the DPF. The amount of fuel injected late in the combustion stroke, post injection, can be increased if the temperature of the catalytic converter rises. The throttle remains partially closed.

The coordinated use, as explained above, of various measures reliably produces the desired increase in exhaust gas temperature under a variety of engine operating conditions. Furthermore, inadvertent and uncontrolled negative effects are avoided.

Although the step sequence described above represents a preferred sequence, the step sequence can be varied within the scope of the present invention. Several steps can be carried out simultaneously or virtually simultaneously. This relates in particular to items a) to c).

Post injection of fuel is postponed until the catalytic converter temperature is above the activation temperature, i.e., the temperature above which significant catalytic conversion takes place. Instead of waiting, attaining the activation temperature can be speeded up by carrying out post injection of fuel close to the time of the main injection, according to item f), until the catalytic converter has reached its operating or activation temperature. In this case, the main injection quantity is reduced, to avoid overshooting torque.

Increase in fuel supply, according to item f), can be produced, for example, by applying a multiplication factor to the basic fuel supply strategy. The multiplication factor depends on the engine speed and/or the intake manifold pressure. The values of this multiplication factor may be established in the course of engine testing and may be stored in table memories.

Post injection of fuel which is carried out in item g) advantageously takes place at approximately 100° after top dead center into an expansion stroke. The expansion stroke is a downward movement of the piston in the cylinder when the cylinder is shut off from the intake and exhaust ducts.

Once a state has been reached in item g), in which the engine is operating with reduced efficiency and hence with increased rejected heat, the result is a temperature rise in the DPF. This state is preferably maintained until all the particulate matter in the DPF has been burned or, in the case of a self-sustaining reaction, until it is certain that the reaction is reliably initiated.

The various parameters which can be influenced, such as EGR, the intake manifold pressure, the fuel supply quantity and the amount of post injection, are preferably controlled such that a sufficiently high temperature is maintained in the particulate filter to burn the particulate matter such that the torque demanded by the driver is produced, so that the driving response is not noticeably impaired.

Furthermore, EGR, the intake manifold pressure, the fuel supply quantity and the amount of post injection are preferably controlled such that the air/fuel ratio remains above a given minimum value. This minimum value is above the stoichiometric level, so that oxygen is available in the exhaust gases for combustion of particulate matter in the DPF.

According to another aspect of the present invention intake manifold pressure is varied in an oscillating manner so that the air/fuel ratio likewise exceeds said minimum value in an oscillating manner. This procedure is appropriate when the required temperature cannot be reached while at the same time maintaining the minimum oxygen concentration downstream from the catalytic converter. In this case, the engine is periodically throttled to reach the required temperature. The thermal energy produced in the process is stored in all parts of the exhaust gas path. Subsequently, sufficient oxygen is provided for the combustion process in the DPF by periodically opening the throttle valve, in which case the exhaust gas temperature remains sufficiently high owing to the thermal inertia of the system, provided the throttle opening intervals are sufficiently short.

Furthermore, while the particulate matter is being burned in item g), or after this step—in a similar way to that in item f)—the restriction to the fresh air supply is reduced if the desired engine speed cannot be maintained or if the driver demands acceleration. The torque demanded by the driver can be taken into account by a differential filter acting in one direction (only for positive acceleration) for the pedal position.

The invention furthermore relates to a diesel engine having EGR, a catalytic converter, a DPF arranged in the exhaust gas system downstream from the catalytic converter, and a control device for regenerating the DPF by increasing the exhaust gas temperature. The control device is connected to sensor inputs and outputs to actuators, such that it can carry out a method of the type explained above.

For the items discussed above to be successful, they are carefully coordinated. In particular, they are started in the correct sequence, and they are not allowed to compete with one another or interfere with one another or with other parts of normal engine control.

Figure 2:
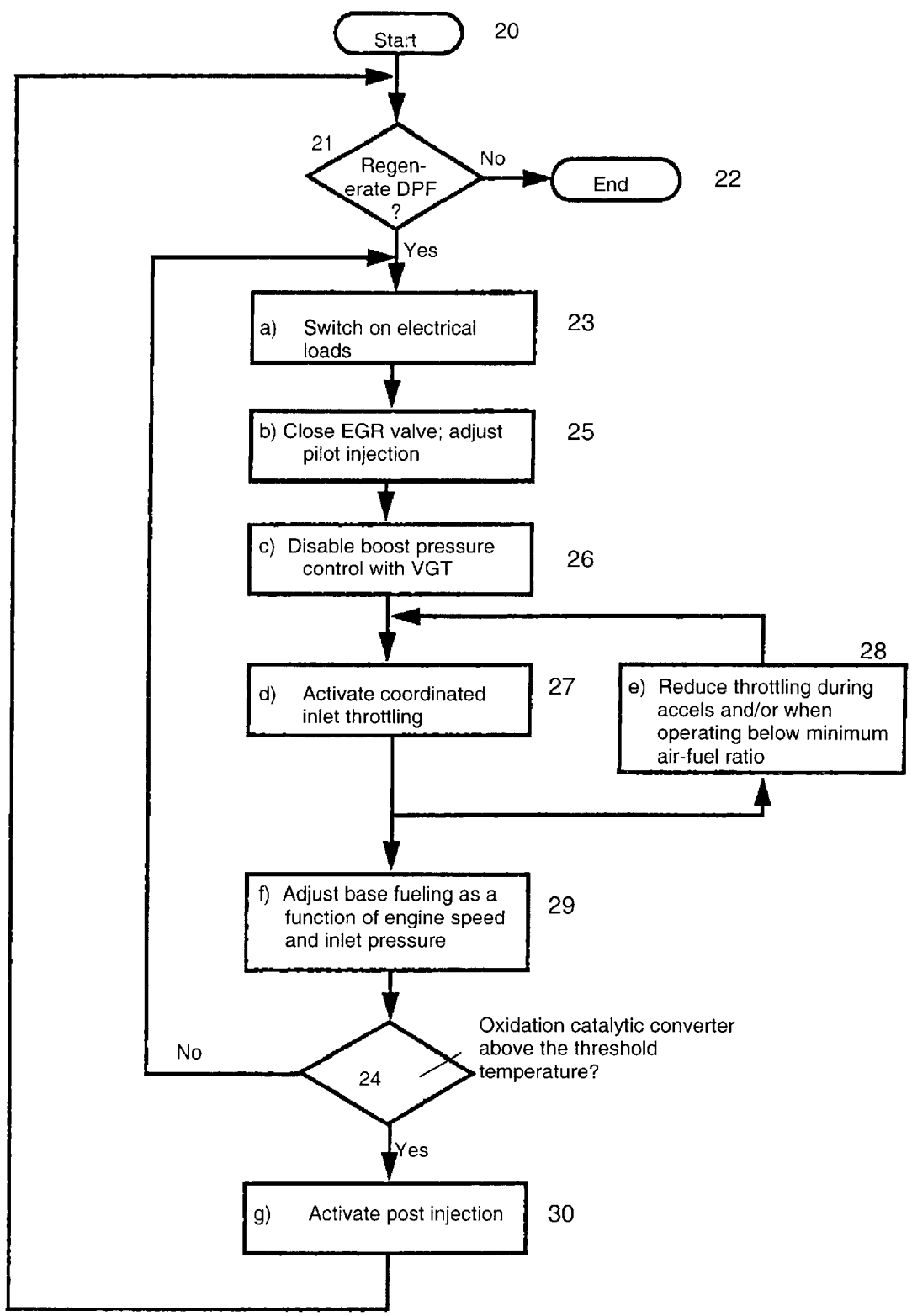
FIG. 2 shows a flowchart of algorithm for controlling exhaust gas temperature.

FIG. 2 shows the control strategy, in the form of a flowchart, according to the present invention. The strategy, according to the present invention, results in the various items being coordinated in such a way to provide efficient regeneration of DPF 10 in a manner, which is robust and is imperceptible to the driver.

The strategy illustrated in FIG. 2 commences after its start 20 with a decision in the block 21 as to whether DPF 10 does or does not need to be regenerated. Methods for making this decision are well known by those skilled in the art, and will thus not be explained further for the purposes of the present invention. If the decision result is negative, the algorithm terminates in block 22.

If, on the other hand, DPF 10 is to be regenerated, control passes to step 23 in which all electrical loads that are suitable for this purpose are switched on to increase the engine load, and hence the production of rejected thermal energy. The battery voltage is monitored continuously during this process. Should it fall below a lower limit value, electrical loads are switched off. However, when battery voltage is low, the alternator provides an additional load on the engine, in recharging the battery. As soon as the nominal battery voltage is reached, said electrical loads are switched on again.

Next, in step 25, EGR valve 2 is closed. At the same time, the pilot injection is adapted, in order that combustion noise remains at an acceptable level.

In the next step, 26, boost pressure feedback control by VGT 8 is disabled. If such control is present, only the feed forward control is retained.

Then, in step 27, intake flow rate is restricted via intake throttle 2, although in a coordinated manner. Closure of intake throttle 2 is lessened in feedback loop 28 if the driver makes a demand for acceleration or if a minimum air/fuel ratio is undershot.

In step 29, the basic fuel supply is adapted as a function of intake manifold pressure and engine speed.

A check is then carried out in block 24 to determine whether the temperature of oxidation catalytic converter 9 is above a threshold value. If catalyst 9 is not above the threshold temperature, control jumps back to step 23. If, on the other hand, catalytic converter 9 has reached its operating temperature, then, in step 30, post injection is activated.

Figure 3:
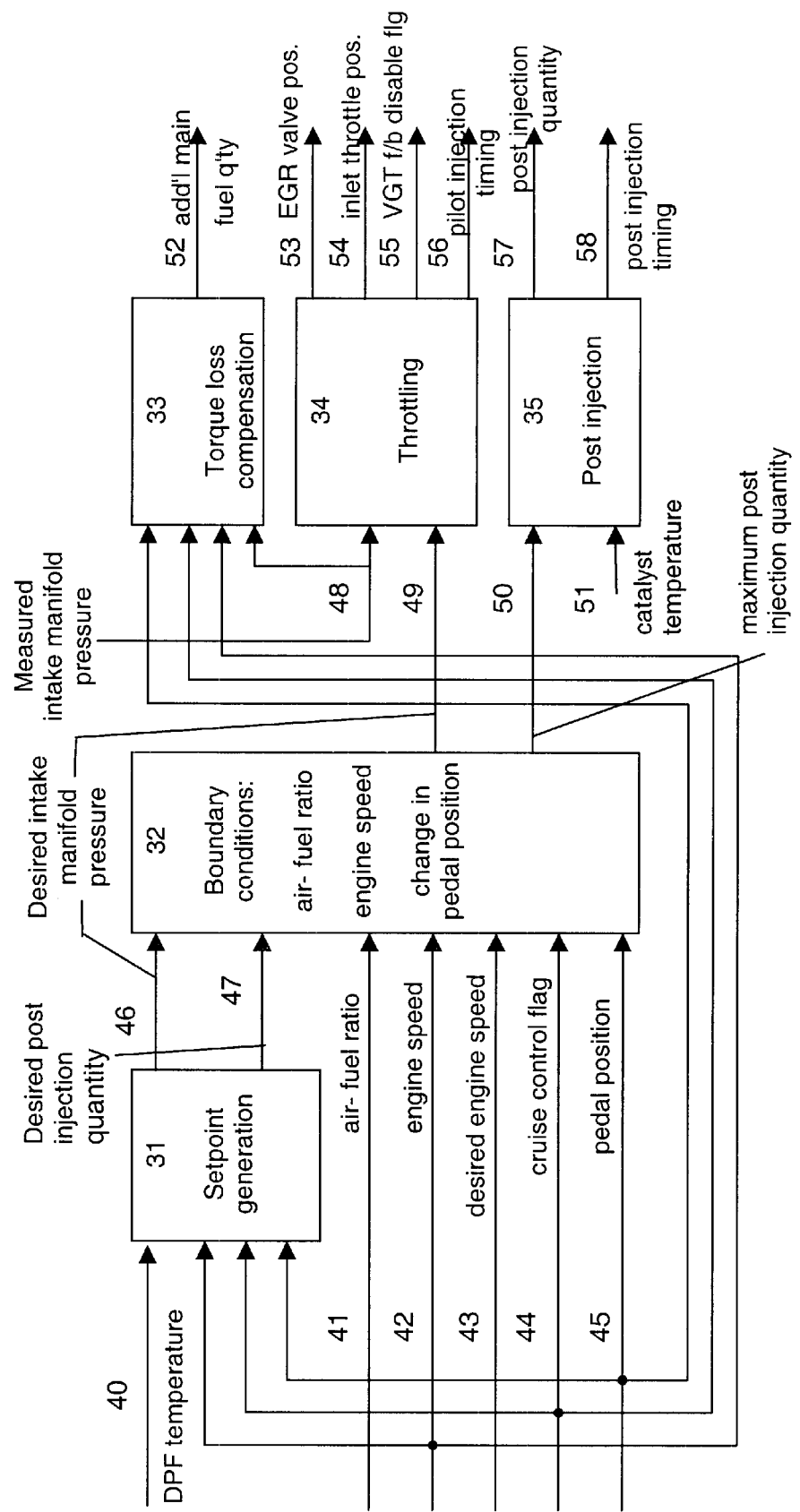
FIG. 3 shows a block diagram of the control strategy for the exhaust gas temperature.

FIG. 3 shows those components: computational subsystems, sensors, actuators, and connections between such, which are significant for exhaust gas temperature regulation according to the present invention. A target value 46 for the intake manifold pressure and the maximum value 47 for post injection are defined in subsystem 31. The input parameters are, in this case, temperature 40 of DPF 10, engine speed 42, cruise control flag 44, and pedal position 45 of the accelerator pedal.

Limiting boundary conditions are taken into account in subsystem 32. These include, in particular, the air/fuel ratio 41, engine speed 42 and changes in pedal position 45. The input parameters of subsystem 32 are the outputs 46 (desired intake manifold pressure) and 47 (maximum post injection amount) of subsystem 31, and signals relating to air/fuel ratio 41, engine speed 42, desired engine speed 43, a cruise control flag 44, and pedal position 45.

On the output side, subsystem 32 passes the desired intake manifold pressure 49 and the maximum post injection amount 50, which have been modified, if necessary, on the basis of the boundary conditions. The desired intake manifold pressure 49 is passed on to a throttle subsystem 34, which uses desired intake manifold pressure 49 and the actual intake manifold pressure 48 to supply signals for the EGR valve position 53, the intake throttle position 54, the pilot injection 55, and for a flag 56 for switching off the VGT feedback.

The maximum post injection amount 50 is passed on to a subsystem 35 for post injection, which also receives a signal 51 relating to the catalytic converter temperature. As its output variables, subsystem 35 provides the post injection amount 57 and the timing control 58 for the post injection process.

Subsystem 33 is provided to compensate for torque reduction. On the input side, subsystem 33 receives signals relating to pedal position 45, cruise control flag 44, engine speed 42, and intake manifold pressure 48. On the output side, subsystem 33 emits a signal 52, which governs the additional fuel supply for the main injection.

While several modes for carrying out the invention have been described in detail, those familiar with the art to which this invention relates will recognize alternative designs and embodiments for practicing the invention. The above-described embodiments are intended to be illustrative of the invention, which may be modified within the scope of the following claims.

We claim:

1. A method for raising the temperature in a particulate filter to cause particulate matter collected in the particulate filter to combust, the particulate filter is coupled to the exhaust of a multi-cylinder, reciprocating engine, the engine has an intake throttle valve coupled to the intake of the engine, an exhaust gas recirculation system, and a fuel injection system comprising fuel injectors disposed in each cylinder and a high pressure fuel supply device, the exhaust gas recirculation system is coupled to the engine intake and the engine exhaust via an exhaust gas recirculation valve, the engine has an electronic control unit operably connected to the intake throttle valve, the exhaust gas recirculation valve, and the fuel injection system, the method comprising the steps of:

closing, at least partially, the exhaust gas recirculation valve;

adjusting the intake throttle valve toward a closed position to provide a desired intake pressure;

increasing a main quantity of fuel supplied by the fuel injectors in response to said closing and adjusting steps, wherein combustion of the main fuel contributes a majority of work produced by the engine, wherein the fuel injection system provides a pilot fuel injection quantity preceding said main fuel injection; and adjusting a timing and a quantity of said pilot fuel injection such that a noise level generated by combustion in the engine remains below a predetermined acceptable level, said adjusting step is accomplished substantially concurrently with said step of closing the exhaust gas recirculation valve.

2. A method for raising the temperature in a particulate filter to cause particulate matter collected in the particulate filter to combust, the particulate filter is coupled to the exhaust of a multi-cylinder, reciprocating engine, the engine has an intake throttle valve coupled to the intake of the engine, an exhaust gas recirculation system, and a fuel injection system comprising fuel injectors disposed in each cylinder and a high pressure fuel supply device, the exhaust gas recirculation system is coupled to the engine intake and the engine exhaust via an exhaust gas recirculation valve, the engine has an electronic control unit operably connected to the intake throttle valve, the exhaust gas recirculation valve, and the fuel injection system, the method comprising the steps of:

closing, at least partially, the exhaust gas recirculation valve;

adjusting the intake throttle valve toward a closed position to provide a desired intake pressure;

increasing a main quantity of fuel supplied by the fuel injectors in response to said closing and adjusting steps, wherein combustion of the main fuel contributes a majority of work produced by the engine, determining an air-fuel ratio supplied to the engine; and opening, partially, the intake throttle valve when said air-fuel ratio is lower than a predetermined air-fuel ratio.

3. A method for raising the temperature in a particulate filter to cause particulate matter collected in the particulate filter to combust, the particulate filter is coupled to the exhaust of a multi-cylinder, reciprocating engine, the engine has an intake throttle valve coupled to the intake of the engine, an exhaust gas recirculation system, and a fuel injection system comprising fuel injectors disposed in each cylinder and a high pressure fuel supply device, the exhaust gas recirculation system is coupled to the engine intake and the engine exhaust via an exhaust gas recirculation valve, the engine has an electronic control unit operably connected to the intake throttle valve, the exhaust gas recirculation valve, and the fuel injection system, the method comprising the steps of:

closing, at least partially, the exhaust gas recirculation valve;

adjusting the intake throttle valve toward a closed position to provide a desired intake pressure;

increasing a main quantity of fuel supplied by the fuel injectors in response to said closing and adjusting steps, wherein combustion of the main fuel contributes a majority of work produced by the engine, wherein said increase in said main quantity of fuel is based on a speed of the engine, an intake pressure, and a demanded engine torque.

4. The method of claim 3 wherein the engine is disposed in a vehicle and the electronic control unit has cruise control and idle speed control modules, said cruise control maintains a constant speed of said vehicle, said idle speed control maintains a constant engine speed, the method further comprising the steps of:

determining whether one of said cruise control and idle speed control modules is active; and discontinuing said increase in said main quantity of fuel when one of said cruise control and said idle speed control modules is active.

5. A system for an engine capable of increasing temperature in a particulate filter coupled to the exhaust of the engine, the engine having a multiplicity of cylinders with pistons reciprocating within the cylinders, an intake with an intake throttle valve, a fuel injection system providing at least one fuel injector disposed in each cylinder, and an exhaust gas recirculation system; the exhaust has an exhaust turbine located upstream of the particulate filter; the exhaust gas recirculation system is coupled to the engine exhaust and the engine intake via exhaust gas recirculation valve; the fuel injection system is capable of providing multiple injections in each cylinder during a single revolution of the engine, comprising:

an electronic control unit operably connected to the engine, the exhaust recirculation valve, the throttle valve, and the fuel injectors, said electronic control unit closes, at least partially, the exhaust gas recirculation valve; said electronic control unit closes, at least partially, the intake throttle valve; and said electronic control unit increases a quantity of main fuel supplied in a main fuel injection event, combustion of said main fuel produces a majority of work developed within the engine, said engine is disposed in a vehicle, glass surfaces comprising a portion of said vehicle's exterior surface; and heating elements affixed to said glass surfaces operably connected to said electronic control unit, wherein said electronic control unit activates said heating elements to increase load on the engine.

6. A method for raining a temperature in a particulate filter to cause particulate matter collected in the particulate filter to combust, the particulate filter is coupled to the exhaust of a multi-cylinder, reciprocating engine, the engine has an intake throttle valve disposed in the intake, an exhaust gas recirculation system coupled to the engine intake and the engine exhaust via an exhaust gas recirculation valve, and a fuel injection system comprising fuel injectors disposed in each cylinder and a high pressure fuel supply device, a catalytic converter coupled to the exhaust upstream of the particulate filter, a variable geometry turbine with adjustable vanes coupled to the exhaust upstream of the catalytic converter, the engine has an electronic control unit operably connected to the intake throttle valve, the exhaust gas recirculation valve, the variable geometry turbine, and the fuel injection system, the method comprising the steps of:

closing, at least partially, the exhaust gas recirculation valve;

adjusting the intake throttle valve toward a closed position, said adjusting step provides a desired intake pressure;

increasing a main quantity of fuel supplied in a main fuel injection in response to said closing and said adjusting steps, combustion of said main fuel provides a majority of work developed with the engine; and discontinuing feedback control of the variable geometry turbine.

7. The method of claim 6, comprising the further steps of:

determining a temperature in the catalytic converter; and injecting a quantity of post injected fuel when said temperature in the catalytic converter exceeds a predetermined activation temperature, said post injection is initiated during an expansion stroke in one of the cylinders, said expansion stroke is a downward movement of a piston in said one cylinder when said one cylinder is shut off from the intake and the exhaust.

8. The method of claim 6, wherein a pilot injection is provided by the fuel injection system, said pilot injection precedes said main fuel injection, the method comprising the further step of:

determining a noise level generated by combustion within the engine; and adjusting a timing of a pilot injection such that said noise level remains below said predetermined acceptable level, said adjusting step is accomplished substantially concurrently with said step of closing the exhaust gas recirculation valve.

9. The method of claim 6, wherein said desired intake pressure is based on a demanded engine torque, said demanded engine torque is based on a position of an accelerator pedal which is operably connected to said electronic control unit.

10. The method of claim 6, wherein said step of discontinuing feedback control of the variable geometry turbine is performed in response to said step of closing the exhaust gas recirculation valve.

11. The method of claim 6, wherein the engine has a catalytic converter disposed in the engine exhaust located upstream of the particulate filter, the method further comprising the steps of:

determining a temperature in the catalytic converter; and injecting a quantity of post injected fuel when said temperature exceeds a predetermined activation temperature, said post injection is initiated during an expansion stroke in one of the cylinders, said expansion stroke is a downward movement of a piston in said one cylinder when said one cylinder is shut off from the intake and the exhaust.

12. The method of claim 6, further comprising the step of providing a demanded engine power concurrently with said steps of closing the exhaust gas recirculation valve, closing the throttle valve, and increasing main fuel injection quantity.

* * * * *